United States Patent
Krishna et al.

(10) Patent No.: US 10,038,745 B2
(45) Date of Patent: Jul. 31, 2018

(54) METHOD FOR MONITORING ELEMENTS OF A DISTRIBUTED COMPUTING SYSTEM

(71) Applicant: VMWARE, INC., Palo Alto, CA (US)

(72) Inventors: Jai Krishna, Bangalore (IN); Vinay Eswara, Bangalore (IN); Gaurav Srivastava, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 128 days.

(21) Appl. No.: 15/151,520

(22) Filed: May 11, 2016

(65) Prior Publication Data

US 2017/0230449 A1    Aug. 10, 2017

(30) Foreign Application Priority Data

Feb. 5, 2016  (IN) .............................. 201641004237

(51) Int. Cl.
   *H04L 29/08* (2006.01)
   *H04L 12/743* (2013.01)
   *H04L 12/26* (2006.01)
(52) U.S. Cl.
   CPC .......... *H04L 67/104* (2013.01); *H04L 43/106* (2013.01); *H04L 45/7453* (2013.01)
(58) Field of Classification Search
   CPC ................................................... H04L 67/104
   USPC ........................................................ 709/224
   See application file for complete search history.

(56) References Cited

U.S. PATENT DOCUMENTS

2010/0125477 A1\* 5/2010 Mousseau ............. G06F 9/5072
                                                                717/177
2013/0262656 A1\* 10/2013 Cao ..................... H04L 41/5009
                                                                709/224

OTHER PUBLICATIONS

David Karger et al. "Consistent Hashing and Random Trees: Distributed Caching Protocols for Relieving Hot Spots on the World Wide Web"; https://www.akamai.com/es/es/multimedia/documents/technical-publication/consistent-hashing-and-random-trees-distributed-caching-protocols-for-relieving-hot-spots-on-the-world-wide-web-technical-publication.pdf, 10 pages.

\* cited by examiner

*Primary Examiner* — Adnan Mirza (57) ABSTRACT

In an embodiment, a method for monitoring elements of a distributed computing system is disclosed. In the embodiment, the method involves evaluating a metric event from a monitored element based on at least one of tags and conditions of the monitored element by applying declared group functions corresponding to declared groups over the metric event and at least one of admitting the monitored element into membership of a declared group, evicting the monitored element from membership of a declared group, and maintaining membership of the monitored element in a declared group based on the evaluation of the metric event.

20 Claims, 10 Drawing Sheets

```
MetricEvent {
  time: 01/01/1970 12:01 AM
  id: "vm-123"
  type: VirtualMachine
  metrics: [
    {name: cpu_percent, value: 90}
    {name: memory_percent, value: 25}
  ]
}
```
— 302

```
Group {
    id:       "hot_hosts"
    name:     "Overloaded Hosts"
    tag:      "critical"
    function: select (element_type = "VirtualMachine" AND
                      element_tag = % "VM" AND
                      metric_name = "cpu_percent" AND
                      metric_value > "80")
}
```

METHOD FOR MONITORING ELEMENTS OF A DISTRIBUTED COMPUTING SYSTEM

RELATED APPLICATIONS

Benefit is claimed under 35 U.S.C. 119(a)-(d) to Foreign application Serial No. 201641004237 filed in India entitled "A METHOD FOR MONITORING ELEMENTS OF A DISTRIBUTED COMPUTING SYSTEM", on Feb. 5, 2016, by VMware, Inc., which is herein incorporated in its entirety by reference for all purposes.

BACKGROUND

A cloud or a cloud computing system typically refers to an internet-based distributed computing system supported by a shared pool of elements (e.g., storage or processing power) that are allocated to different tasks as needed. Cloud services typically incorporate monitoring capabilities that monitor the shared elements. Monitoring is fundamentally event-based. An event could be something that occurs occasionally (e.g., a lifecycle event such as the creation of an element or deletion of an element) or an event could be something that occurs periodically and forms the basis of a time-series (e.g., a record of values of an observed quantity at successive points in time.)

Typically, a cloud monitoring system processes incoming events that pertain to monitored elements and filters the events for each monitored elements (e.g., called a "metric stream"). The monitored elements may then fall into logical groups based on the filtered events and the logical groups can be used to simultaneously manipulate the elements within the group (e.g., migration or suspension).

SUMMARY

In an embodiment, a method for monitoring elements of a distributed computing system is disclosed. In the embodiment, the method involves evaluating a metric event from a monitored element based on at least one of tags and conditions of the monitored element by applying declared group functions corresponding to declared groups over the metric event and at least one of admitting the monitored element into membership of a declared group, evicting the monitored element from membership of a declared group, and maintaining membership of the monitored element in a declared group based on the evaluation of the metric event.

In another embodiment, the monitored element is admitted into membership of a declared group when a declared group function corresponding to the declared group returns true when evaluated over the metric event.

In another embodiment, the monitored element is evicted from membership of a declared group when the monitored element is a member of the declared group and the corresponding declared group function returns false when evaluated over the metric event.

In another embodiment, membership of the monitored element in a declared group is maintained when the monitored element is a member of the declared group and the corresponding declared group function returns true when evaluated over the metric event.

In another embodiment, an audit log is generated, the audit log recording a timestamp indicating when the monitored element is at least one of admitted and evicted from a declared group.

In another embodiment, the monitored element is at least one of a cluster, a virtual machine, a data store, a network, and a declared group.

In another embodiment, tags are assigned to a monitored element by a user.

In another embodiment, the metric event is routed to a system VM for evaluation by a consistent hash message bus based on a routing key of the metric event used by a consistent hashing algorithm.

In another embodiment, a message is transmitted to a consistent hash message bus when a monitored element is at least one of admitted and evicted into membership of a declared group, the message including the ID of the monitored element.

In another embodiment, when the message is received by the consistent hash message bus, a consistent hash table that maps a monitored element ID to a declared group ID is updated.

In another embodiment, a non-transitory computer-readable storage medium is disclosed. In the embodiment, the non-transitory computer-readable storage medium stores instructions that, when executed in a computing device, cause the computing device to carry out steps for grouping elements of a distributed computing system monitored by a monitoring system, the steps involving evaluating a metric event from a monitored element based on at least one of tags and conditions of the monitored element by applying declared group functions corresponding to declared groups over the metric event and at least one of admitting the monitored element into membership of a declared group, evicting the monitored element from membership of a declared group, and maintaining membership of the monitored element in a declared group based on the evaluation of the metric event.

In another embodiment, the monitored element is admitted into membership of a declared group when a declared group function corresponding to the declared group returns true when evaluated over the metric event.

In another embodiment, the monitored element is evicted from membership of a declared group when the monitored element is a member of the declared group and the corresponding declared group function returns false when evaluated over the metric event.

In another embodiment, membership of the monitored element in a declared group is maintained when the monitored element is a member of the declared group and the corresponding declared group function returns true when evaluated over the metric event.

In another embodiment, further steps involved generating an audit log, the audit log recording a timestamp indicating when the monitored element is at least one of admitted and evicted from a declared group.

In another embodiment, the monitored element is at least one of a cluster, a virtual machine, a data store, a network, and a declared group.

In another embodiment, tags are assigned to a monitored element by a user.

In another embodiment, the metric event is routed to a system VM for evaluation by a consistent hash message bus based on a routing key of the metric event used by a consistent hashing algorithm.

In another embodiment, further steps involve transmitting a message to a consistent hash message bus when a monitored element is at least one of admitted and evicted into membership of a declared group, the message including the ID of the monitored element.

In another embodiment, when the message is received by the consistent hash message bus, further steps involve updating a consistent hash table that maps a monitored element ID to a declared group ID.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
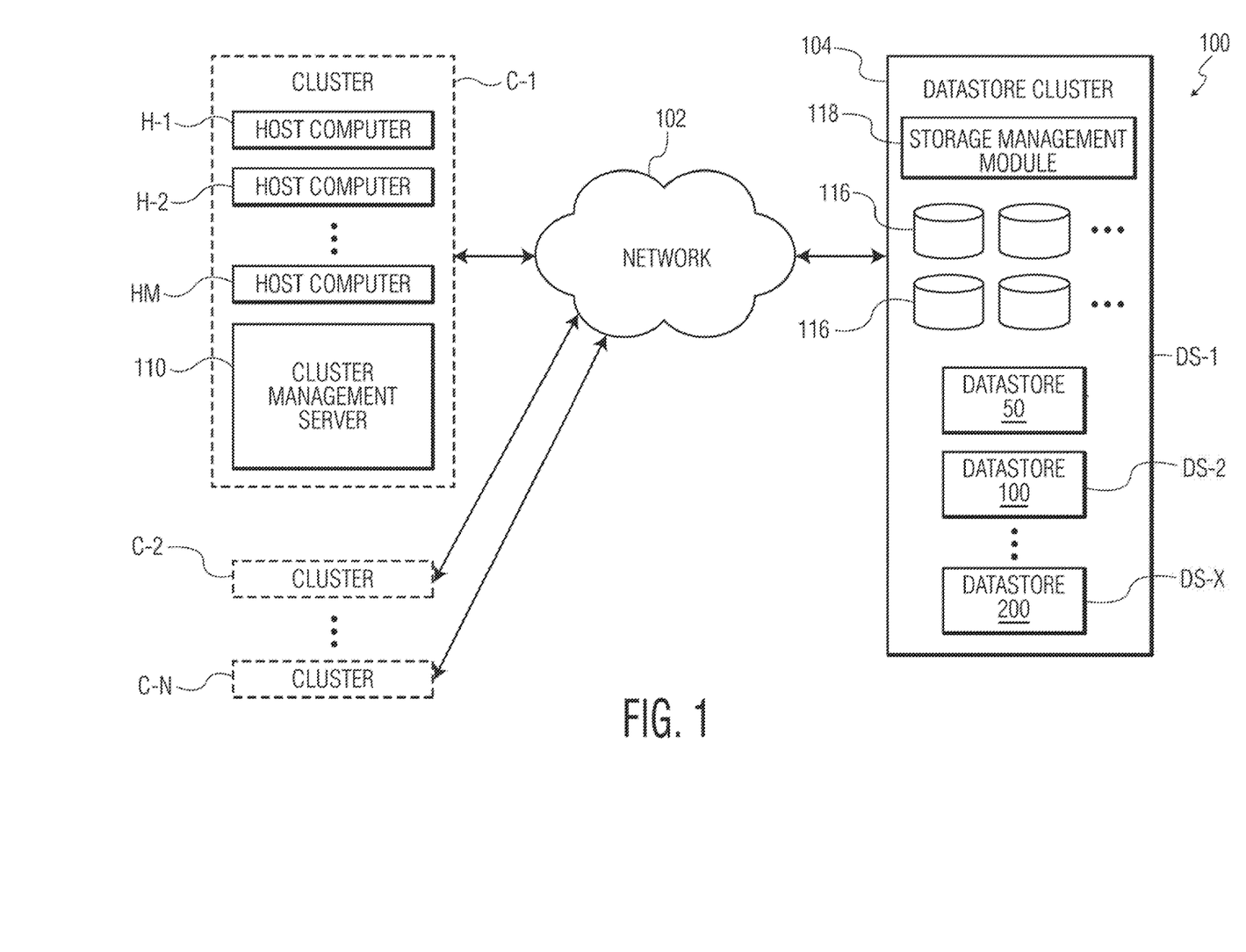
FIG. 1 illustrates a distributed computing system.

FIG. 1 illustrates a distributed computing system 100. In an embodiment, a distributed computing system can be referred as a "cloud" or a "cloud computing system." The distributed computing system includes a network 102, clusters C-1, C-2 . . . C-N (where N is a positive integer) of host computers, and a datastore cluster 104. The exact number of host computer clusters included in the distributed computing system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110. The host computers may be servers that are commonly found in data centers. As an example, the host computers may be servers installed in one or more server racks. Typically, the host computers of a cluster are located within the same server rack. The number of host computers included in each of the clusters can be any number from, for example, one to several hundred or more. In addition, the number of host computers included in each of the clusters can vary so that different clusters can have a different number of host computers. In the embodiment of FIG. 1, the host computers are physical computer systems that host or support one or more virtual machines (VMs) so that the VMs are executing on the physical computer systems. The VMs may vary in type to include, for example, application VMs and/or System VMs.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers. The monitored configurations may include the hardware configuration of each of the host computers, such as CPU type and memory size, software configurations of each of the host computers, such as operating system (OS) type and installed applications or software programs, and/or the current usage of resources by the VMs, e.g., CPU processing usage, memory usage, network usage and/or storage usage, and provided to the respective cluster management server.

In some embodiments, the cluster management servers 110 may be implemented on separate physical computers. In other embodiments, the cluster management servers may be implemented as software programs running on a host computer or a virtual computer. In an implementation, the cluster management servers are VMware vCenter™ servers with at least some of the features available for such servers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE), and HyperSCSI.

The datastore cluster 104 is used to store data for the host computers of the clusters C-1, C-2 . . . C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices such as hard disks, solid-state devices (SSDs), or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the managing module is a computer program executing on one or more computer systems (not shown) of the datastore cluster. The datastore cluster supports multiple virtualized representations of storage facilities, referred to as datastores DS-1, DS-2 . . . DS-X (where X is a positive integer), which may be identified using logical unit numbers (LUNs). Thus, each datastore may use resources from more than one storage device included in the datastore cluster. The datastores are used to store data associated with the VMs supported by the host computers of the clusters C-1, C-2 . . . C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
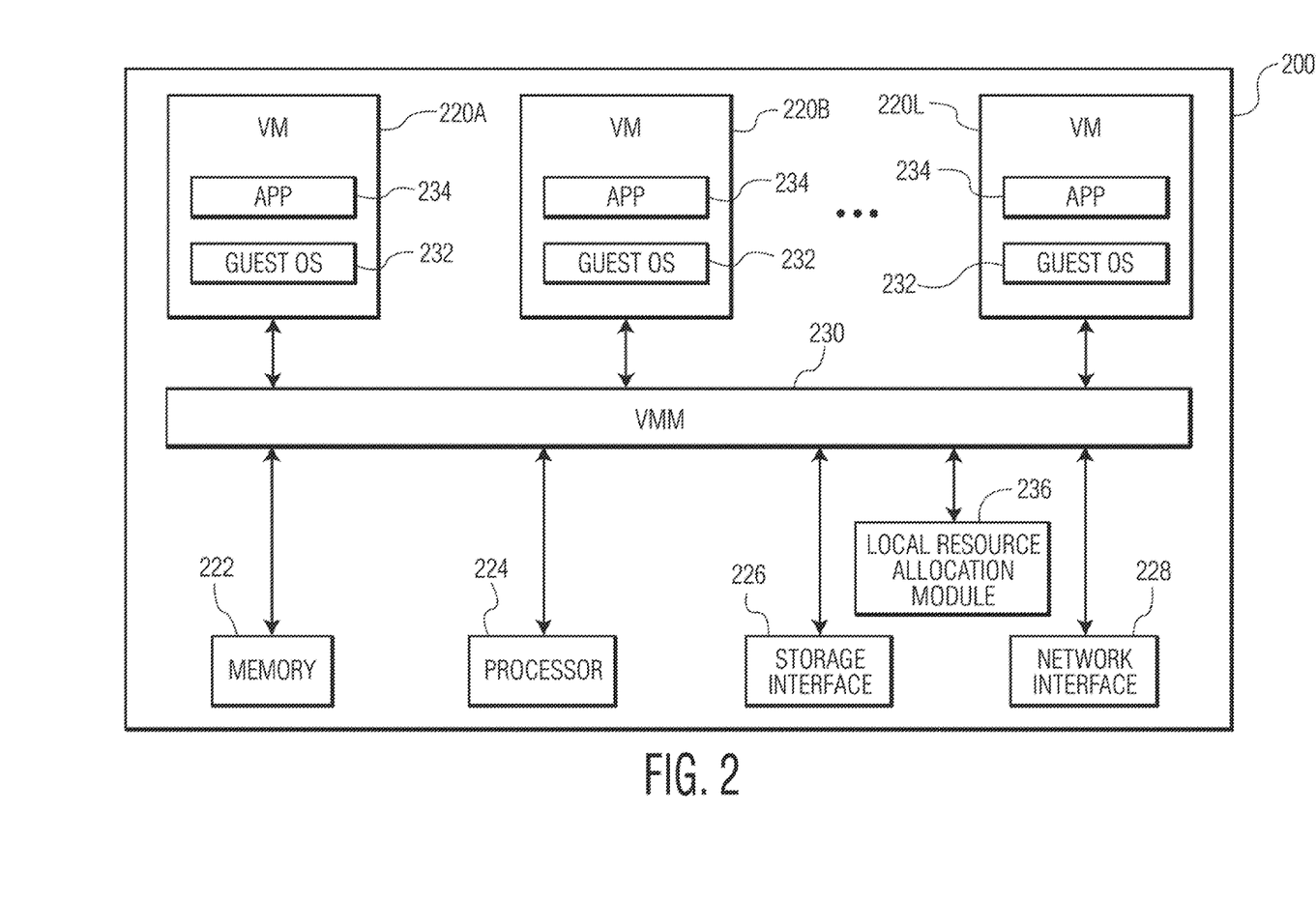
FIG. 2 is a block diagram of a host computer in a distributed computing system.

Turning now to FIG. 2, components of a host computer 200, which is representative of the host computers H-1, H-2 . . . H-M, are shown. In the illustrated embodiment, the host computer is configured to support a number of VMs 220-1, 220-2 . . . 220-L (where L is a positive integer). The number of VMs supported by the host computer can be anywhere from one to more than one hundred. The exact number of VMs supported by the host computer is only limited by the physical resources of the host computer. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter. The hardware resources of the host computer can be allocated by a local resource allocation module 236.

In the illustrated embodiment, the VMs 220-1, 220-2 . . . 220-L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM may include a guest operating system 232 and one or more guest applications 234. The guest operating system is a master control program of the respective VM and, among other things, the guest operating system forms a software platform on top of which the guest applications run. Guest applications are individual programs such as, for example, an email manager or a system logger.

Similar to any other computer system connected to the network 102 in FIG. 1, the VMs 220-1, 220-2 . . . 220-L shown in FIG. 2 are able to communicate with other computer systems connected to the network using the network interface 228 of the host computer 200. In addition, the VMs are able to access the datastore cluster 104 (FIG. 1) using the storage interface 226 (FIG. 2) of the host computer.

Figure 3:
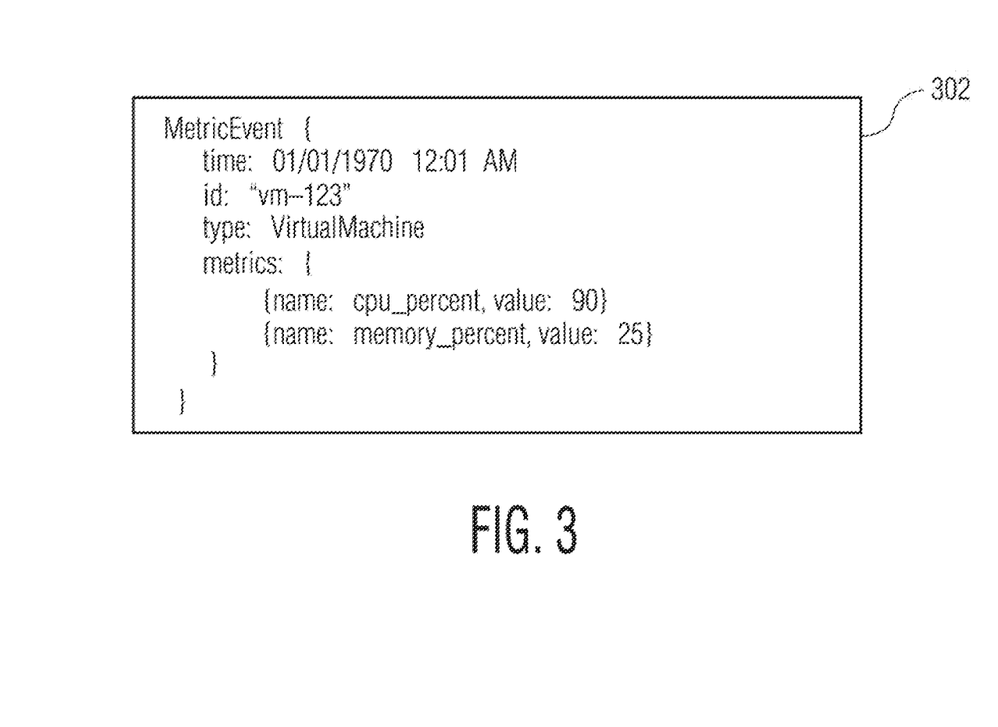
FIG. 3 illustrates an example of a metric event message.

A typical monitoring system can be implemented in a cluster management server to monitor the operations of elements described above with respect to FIG. 1 (e.g., VMs, clusters, datastores, a network). To facilitate the monitoring system, the elements within the distributed computing system can be configured to generate metric events and the metric events can be recorded in system logs for user or administrator review. FIG. 3 illustrates an example of a metric event message 302. In an embodiment, metric events can report various information about an element. For example, the metric event of FIG. 3 reports the time at which the metric event was generated (01/01/1970 12:01 AM), the ID of the element (vm-123), the type of the element (VirtualMachine), and metrics for the element such as the percent of CPU (cpu_percent, value:90) and memory (memory_percent, value: 25) in use (e.g., the CPU and memory being a portion of CPU and memory allocated to the VM from the host). Typically, metric events are recorded in a system log for review by a user or a system administrator. The log can be filtered or sorted based on the various information reported by the metric events and the user or system administrator can determine system behavior based on the filtered and/or sorted information. For example, the system administrator can use the information to determine if some VMs are experiencing very high CPU or memory usage. However, in order to do so, the system administrator will typically have to manually filter and/or sort the metric events to determine the behavior of the VMs (e.g., the high CPU usage or high memory usage) and further sort the metric events to determine when the behavior is occurring (e.g., at night, during peak usage hours, etc.). Such filtering and/or sorting by a user or system administrator can be inefficient and time consuming.

In accordance with an embodiment of the invention, a method for monitoring elements of a distributed computing system is disclosed. In the embodiment, the method involves evaluating a metric event from a monitored element based on at least one of tags and conditions of the monitored element by applying declared group functions corresponding to declared groups over the metric event and at least one of admitting the monitored element into membership of a declared group, evicting the monitored element from membership of a declared group, and maintaining membership of the monitored element in a declared group based on the evaluation of the metric event. In an embodiment, a tag is a string or a label (typically in a human readable language) assigned to a managed element based on a quality or trait of the element (e.g., "Mike's laptop" or "high CPU group") and a condition is a rule or Boolean expression evaluated to determine membership of a declared group. Thus, groups corresponding to specific behaviors (e.g., high CPU or high memory usage) can be declared, and monitored elements can be admitted to or evicted from the groups based on metric events (e.g., CPU or memory usage) generated by the monitored elements. Additionally, groups corresponding to condition can be declared (e.g., a "critical" group can be declared) and monitored elements (e.g., groups defined by high CPU or high memory usage now treated as monitored elements) can be admitted to or evicted from the groups. In accordance with an embodiment of the invention, monitored elements are admitted to or evicted from groups by applying declared group functions. A declared group function may be applied to a monitored element by evaluating the declared group function using a parameter or variable of the monitored element. For example, a declared group function for a "high CPU" declared group is applied to a monitored element by determining CPU usage of the monitored element from a metric event and evaluating the declared group function using the determined CPU usage. In an embodiment, metric events can be evaluated at the time the metric event is received (e.g., in real-time). The admissions and evictions of the monitored elements into the declared groups can be logged in an audit log when the admission or eviction occurs and a user or system administrator need only review the audit logs to determine when and what system behavior is occurring. Thus, the complexity of monitoring system behavior can be reduced.

Figure 4A:
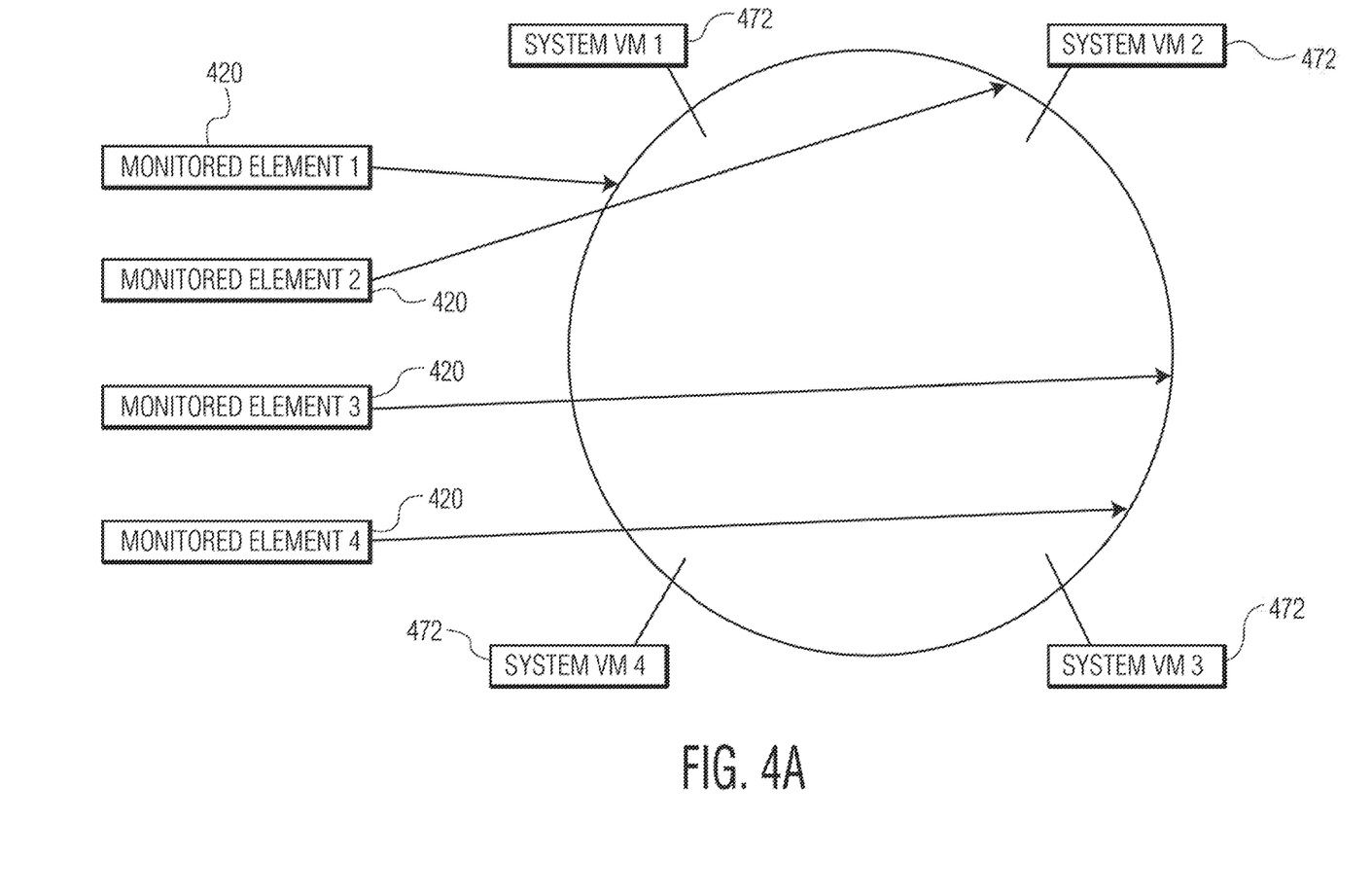
FIGS. 4A-4C illustrate consistent hashing in accordance with an embodiment of the invention.
Figure 4B:
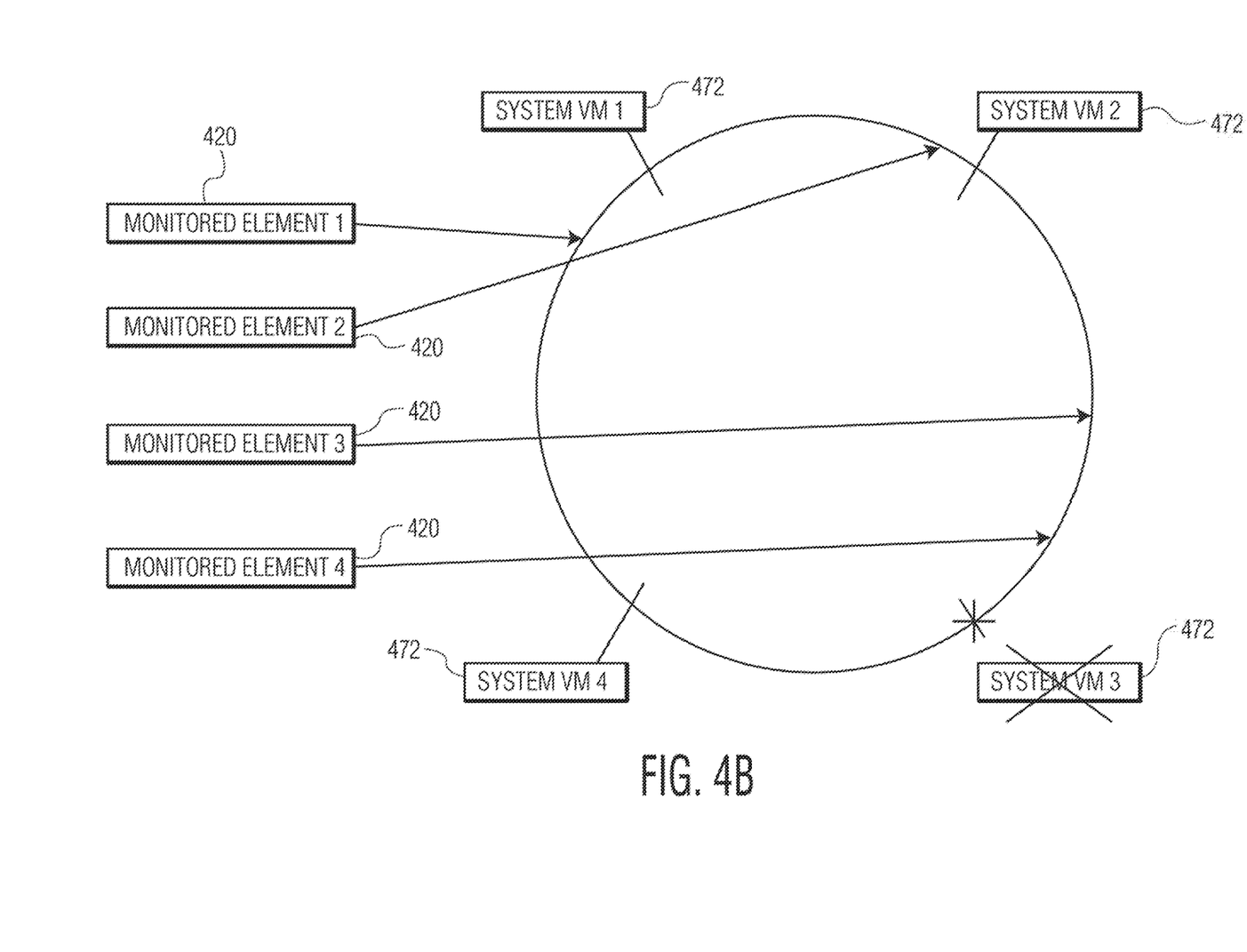
Figure 4C:
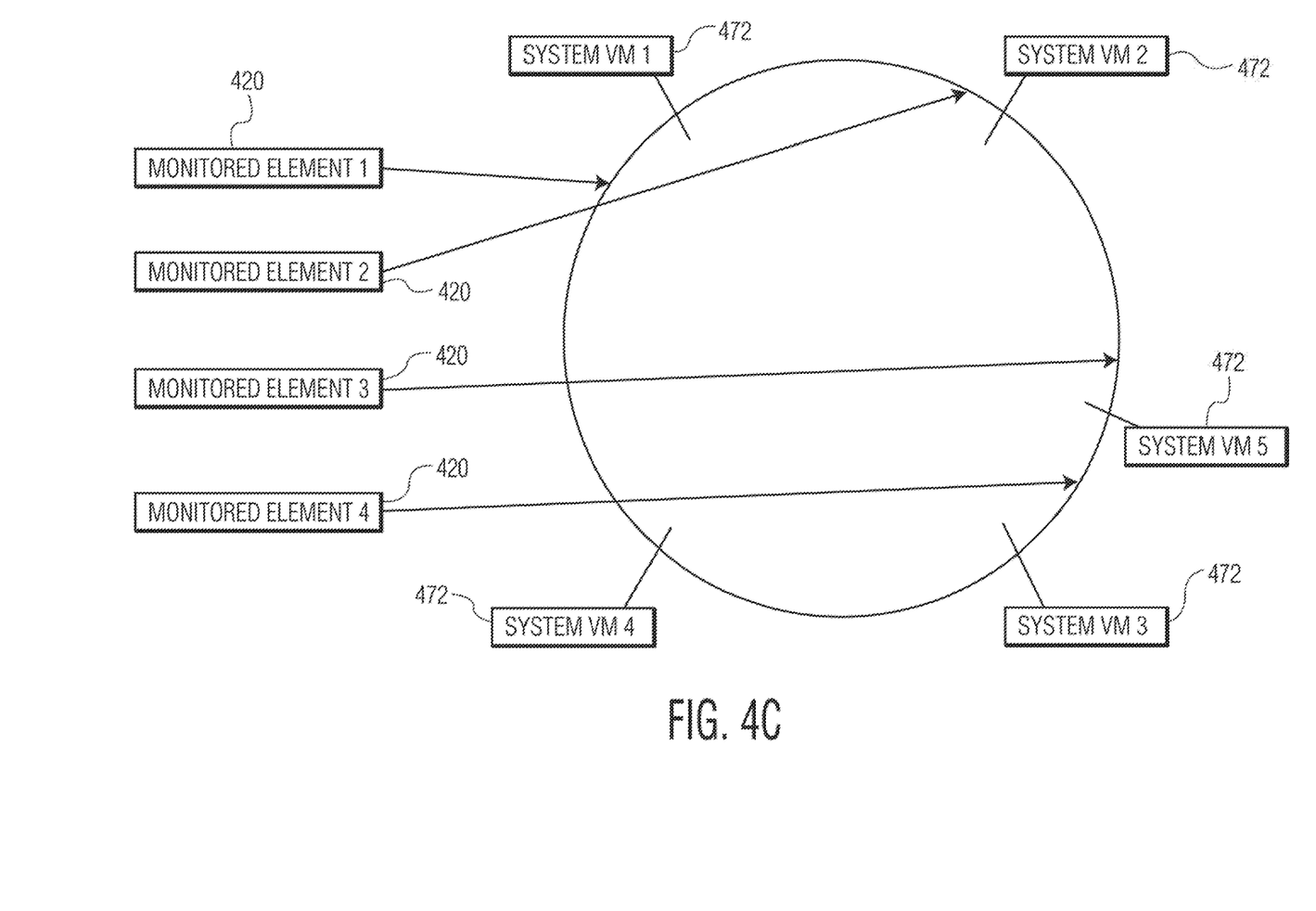

In an embodiment, metric events from a monitored element (e.g., a VM) are evaluated by a System VM to which the monitored element is mapped and the mapping is determined using consistent hashing. FIGS. 4A-4C illustrate consistent hashing in accordance with an embodiment of the invention. In FIG. 4A, four monitored elements 420 and four system VMs 472 are illustrated. The data streams from the four monitored elements are directed to one of the four system VMs using a consistent hashing algorithm. For illustrative purposes, consistent hashing is visually explained using a circle on which each System VM is a node, but System VMs can be arranged in any formation in operation. When a metric event from a data stream of a monitored element is received, a routing key is calculated from an element ID of the monitored element using the consistent hashing algorithm. The system VM selected to process the metric event is selected by starting at a "point on the circle" corresponding to the value of the routing key and moving clockwise around the circle until a node is reached. For example, a routing key for monitored element 1 that corresponds to a point on the circle (e.g., the point indicated by the arrow between monitored element 1 and the circle in FIG. 4A) is generated by the monitoring system. The first node encountered when moving clockwise along the circle from the point is a node corresponding to System VM 1.

Thus, monitored element 1 will be mapped to System VM 1 and metric events from the data stream of monitored element 1 will be processed by System VM 1. Similarly, monitored element 2 will be mapped to System VM 2, and monitored element 3 and monitored element 4 will be mapped to System VM 3. To insure a generally balanced distribution across the System VMs, the nodes are evenly spaced around the circle. For example, if the hashing algorithm is configured to generate 20 keys, then the four System VMs will be placed 5 keys apart. In an embodiment, metric events can be generated by groups, as described below, and can be routed to a System VM based on the group ID. That is, groups can be treated as monitored elements.

Typically, even distribution is achieved by mapping a monitored element to the next System VM with the least monitored elements mapped to it. That is, if there are N System VMs and N+2 monitored elements, then monitored element N+1 would be mapped to system VM1 (e.g., all VMs have one monitored element mapped to them and VM1 is the next VM looping back from VMN) and monitored element N+2 would be mapped to System VM 2 because System VM 2 would be the next VM with the least monitored elements mapped to it. Because the mapping is based on the order of the VMs, if one System VM should fail, all monitored elements mapped to the failed VM would be remapped to the subsequent VM and all monitored elements mapped to the subsequent VM would be remapped and so on until all monitored elements mapped to System VMs subsequent to the failed System VM have been remapped. For example, if monitored elements 1 and 5 are mapped to System VM 1, monitored element 2 is mapped to System VM 2, monitored element 3 is mapped to System VM 3, and monitored element 4 is mapped to System VM 4, then, if System VM 1 fails, monitored elements 1 and 5 would be remapped to System VM 2, monitored element 2 would be remapped to System VM 3, monitored element 3 would be remapped to System VM 4, and monitored element 4 would be remapped to System VM 2. Thus, all monitored elements would have to be remapped due to the failure of a single System VM.

Alternatively, by routing metric events from data streams using consistent hashing, fewer monitored elements may need to be remapped in the event of System VM failures. For example, as illustrated in FIG. 4B, if System VM 3 fails, then moving around the circle to the next node would result in monitored elements 3 and 4 being mapped to System VM 4, but monitored elements 1 and 2 would not need to be remapped. Similarly, if a new System VM is brought online, monitored elements can be remapped to the new System VM without remapping all subsequent monitored elements. For example, as illustrated in FIG. 4C, if new System VM 5 is brought online, then monitored element 3 would be remapped to System VM 5, but the other monitored elements would remain unaffected. Thus, system performance when System VMs fail or are brought online can be improved because fewer monitored elements need to be remapped than when conventional mapping techniques are used.

Figure 5:
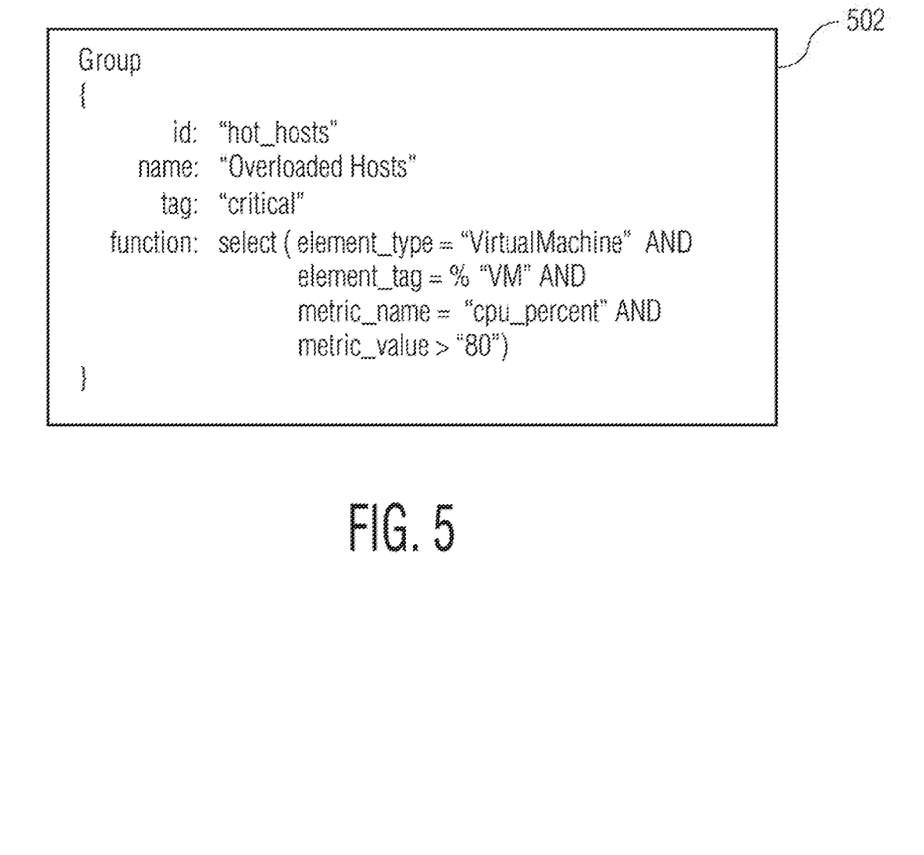
FIG. 5 depicts a definition of a declared group in accordance with an embodiment of invention.

In an embodiment, monitored elements are evaluated by admitting to, evicting from, or maintaining membership in a declared group based on the evaluation of the metric event. In an embodiment, a declared group is a logical grouping used to categorize behavior for historical analysis and can be defined by a declared group function that is evaluated over tags and/or conditions of a monitored element. FIG. 5 depicts a definition of a declared group 502 in accordance with an embodiment of the invention. As depicted in FIG. 5, a declared group definition can include a group ID (hot_hosts), a group name (Overloaded Hosts), a group tag (critical), and a function that defines the conditions and/or tags required for membership in the declared group (element_type="VirtualMachine" AND element_tag=% "VM" AND metric_name="cpu_percent" AND metric_value>"80"). A tag of a monitored element can be assigned to a monitored element by a user based on a quality or trait of the element. In an embodiment, tags can be human readable labels indicating a property of a monitored element (e.g., a description of CPU usage by the monitored element such as "high"), a type of a monitored element (e.g., database, storage, etc.), or a trait of the monitored element that is independent of performance metrics (e.g., a description of the parties using the monitored element). For example, a tag could indicate the type of the monitored element (e.g., "Database") or to whom the monitored element belongs (e.g., a "Human resources VM" or "Finance & Accounting VM"). A condition of a monitored element can include, for example, CPU usage, memory usage, network input/output, and disk input/output operations per second. In the example of FIG. 5, the group is defined by a condition (e.g., CPU usage >80%) and a tag (e.g., the tag of the monitored element includes the word "VM"). In an embodiment, the definition of a declared group can be represented by a mathematical formula, but other techniques can be used to define a declared group. In an embodiment, data about a declared group itself can also be processed by a system VM and, thus, each declared group can also be a monitored element and further grouped. For example, the declared group defined by "CPU usage >80%" can be monitored and tagged "critical." The declared group could then be part of a second declared group defined by "tag=='critical'" and the second declared group may also include a single VM tagged 'critical.'"

Figure 6:
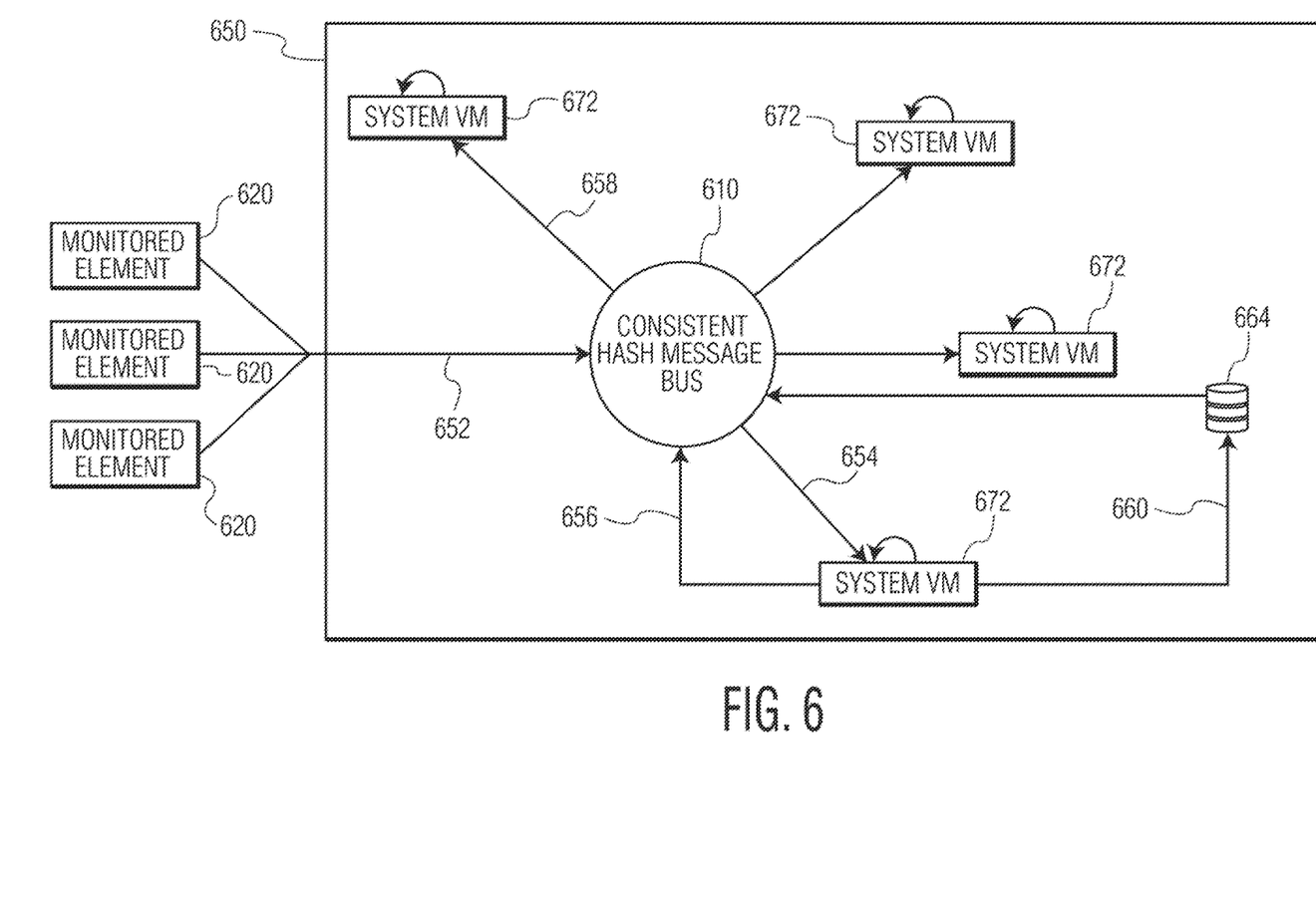
FIG. 6 depicts a monitoring system in accordance with an embodiment of the invention.

In an embodiment, the membership of monitored elements in declared groups is managed by a monitoring system. FIG. 6 depicts a monitoring system 650 in accordance with an embodiment of the invention. The monitoring system includes a consistent hash message bus 610, a database 664, and system VMs 672 connected to monitored elements 620. In an embodiment, the consistent hash message bus can be implemented in a cluster management server, a host computer in a cluster, or a VM running on a host computer in a cluster and monitored elements can be single components of a distributed computing system (e.g., VMs, clusters, data stores, a network) or logical components formed from several components (e.g., a group of VMs or data stores). In an embodiment, when a metric event is generated by a monitored element, the metric event is sent (e.g., in real-time) to the consistent hash message bus as indicated by arrow 652 and the consistent hash message bus forwards the metric event to the appropriate system VM (e.g., the system VM to which the monitored element is mapped) as indicated by arrow 654. Once forwarded, the metric event is then evaluated by the System VM by applying one or more declared group functions to determine membership of the monitored element in one or more groups, membership information is written to a database by the System VM as indicated by arrow 660, and a message is generated by the System VM. The message is sent, as indicated by arrow 656, to the consistent hash message bus for each group to which the monitored element is added to report the change in the membership of the group. For example, a monitored element generates a metric event reporting CPU usage over 80%. The message is sent to the consistent hash message bus and forwarded to a System VM. The System VM applies a declared group function, by evaluating the declared group function using the CPU usage reported by the metric event, to determine that the monitored element should be admitted to the group defined by "CPU>80%," and writes membership information indicating the membership of the monitored element in the group to a database (e.g., on a datastore). Because membership information is written to the database, the database is continuously updated with the most recent group membership information, which allows for recovery in case of machine failure (e.g., one of the System VMs goes down). The System VM then generates a message reporting the change in group membership and sends the message to the consistent hash message bus. In an embodiment, the membership information is written to the database at the same time the System VM sends the message. The consistent hash message bus then forwards the message along to the appropriate System VM (e.g., the System VM to which the group is mapped), as indicated by arrow 658, based on the group ID. In an embodiment, when the System VM sends the message reporting the change in group membership to the consistent hash message bus, data of the members of the group (e.g., element ID or metrics) can be sent as well and forwarded along to the same appropriate System VM. For example, when a message indicating a change in membership of the group defined by "CPU>80%" is sent to System VM 1, the CPU usage metrics of all the members of the group are sent to System VM 1 as well. The chain of messages repeats until a System VM processes the message and determines that membership should be maintained and no further message or messages need to be generated. In an embodiment, when the System VM generate a message reporting a change in group membership of an entity, the change is reported back to the entity. For example, when a monitored element is admitted to the group defined by "CPU>80%" the System VM sends a message to the consistent hash message bus and back to the monitored element as well. In an embodiment, membership of the monitored element in a group can be re-evaluated, as described below, when each metric event or message is forwarded to a System VM. If a change in membership is appropriate (e.g., the monitored element no longer satisfies the definition of the group), then the eviction of the monitored element is recorded in the database. If the monitored element is admitted to another group, the admission is similarly recorded in the database. If no change is appropriate, then no additional action is needed. In an embodiment, the database records are indexed such that, given a group ID, all current member IDs can be identified and, given an element ID, all groups to which the monitored element belongs can be identified.

Figure 7A:
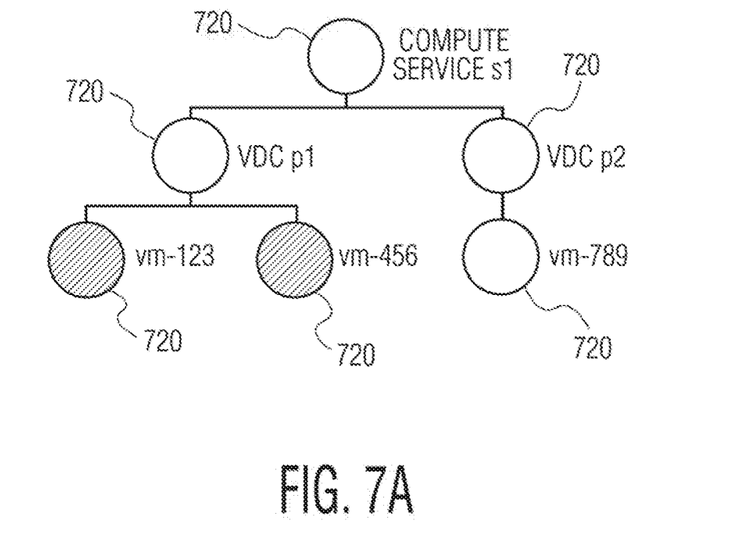
FIGS. 7A and 7B illustrate an example reevaluation process for determining membership of monitored elements.
Figure 7B:
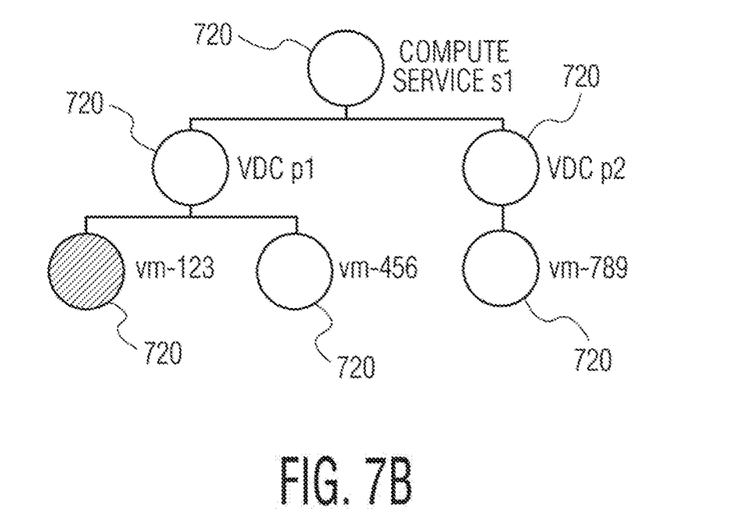

In an embodiment, membership of a monitored element within a group is reevaluated by a system VM when each metric event or message is received by evaluating a function defining the group over the metric event or message. FIGS. 7A and 7B illustrate an example reevaluation process for determining membership of monitored elements 720. Initially, as shown in FIG. 7A, vm-123 and vm-456 are members of a "high CPU" group defined by "CPU >90%." In FIG. 7A, members of the "high CPU" group are indicated by patterned circles, while non-members are indicated by unpatterned circles. When a metric event for vm-456 indicating that CPU usage has dropped to 40% is received, the System VM that processes messages from vm-456 re-evaluates the group function over the metric event (e.g., evaluates the function "40%>90%") and returns false. Accordingly, vm-456 is evicted from the high CPU group, the change in membership is recorded in a database, and a message is generated and forwarded to the consistent hash message bus. As shown in FIG. 7B, in the resulting membership, vm-456 is no longer a member of the high CPU group.

In an embodiment, when a System VM determines a change is appropriate, messages can be transmitted back to the consistent hash message bus. In an embodiment, messages are sent in JavaScript Object Notation (JSON) format. For example, if an operating system on a guest VM changes to "Windows," then the message indicating the change will include a first array that indicates where the guest VM is located in a system hierarchy (e.g., in the virtual device context) and a second array including metrics that indicate CPU usage and the OS of the VM. In an embodiment, when a System VM determines that a monitored element should be admitted to a group, the System VM sends a "GROUP JOIN" message to the consistent hash message bus that includes the group ID as the routing key and, when a System VM determines that a monitored element should be evicted from a group, the System VM sends a "GROUP EXIT" message to the consistent hash message bus that includes the group ID as the routing key. The message is then forwarded to the appropriate System VM based on the group ID included in the message. In an embodiment, when a System VM determines that no change is appropriate, no message is sent to the consistent hash message bus. By having several System VMs evaluate element membership, the consistent hash message bus need only receive messages when membership is modified (rather than receiving a GROUP JOIN or GROUP EXIT message for each metric event), which can allow for automatic auditing of group membership and the reduction of messages being sent across the management system.

Figure 8:
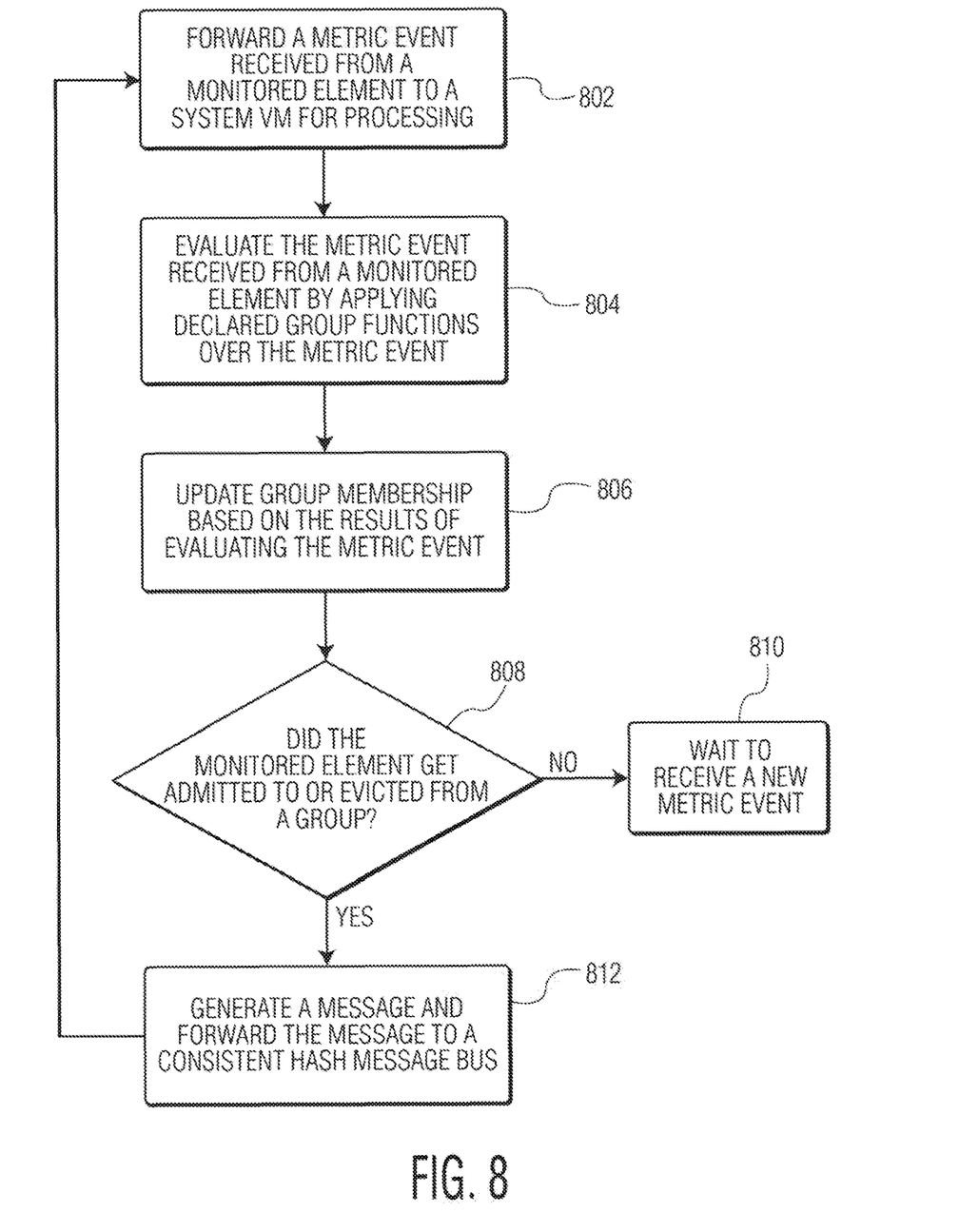
FIG. 8 is a flow chart diagram of a method for monitoring elements in accordance with an embodiment of the current invention.

FIG. 8 is a flow chart diagram of a method for monitoring elements in accordance with an embodiment of the current invention. When a metric event is generated and received (e.g., in real-time) by a consistent hash message bus in a management system from a monitored element, then, at block 802, the metric event is forwarded to a System VM for processing. In an embodiment, the metric event is forwarded to the System VM to which the monitored element is mapped according to the consistent hashing algorithm described above with respect to FIGS. 4A-4C. At block 804, the metric event is evaluated by applying declared group functions over the metric event. In an embodiment, the declared group functions are cached on each System VM and the System VM to which the metric event is forwarded applies the declared group functions over the metric event. In an embodiment, all of the declared group functions are applied, but, in an alternative embodiment, a subset of declared group functions can be applied such that conflicting declared group functions need not be applied (e.g., CPU>90% and CPU<50% will not both be applied if true is returned for one of the functions). At block 806, group membership is updated based on the results of evaluating the metric event. In an embodiment, the System VM to which the metric event is forwarded writes the group membership data to a database. In an embodiment, the group membership data can be the membership status (in one or more groups) of the monitored element from which the metric event was received. At decision point 808, it is determined whether the monitored element was admitted to or evicted from a group. In an embodiment, a monitored element is admitted to a group when the monitored element is not already admitted to the group and the declared group function of the group returns true when evaluated over the metric event. A monitored element is evicted from a group if the monitored element was previously a member of a group, but the declared group function corresponding to the group returns false when evaluated over the metric event. In an embodiment, if the monitored element was neither admitted nor evicted from a group, then, at block 810, the monitoring system waits to receive a new metric event. Alternatively, if a monitored element was admitted and/or evicted from a group, then, at block 812, a message is generated and forwarded to the consistent hash message bus. In an embodiment, a GROUP JOIN message is generated for each group the monitored element is admitted in to and a GROUP EXIT message is generated for each group from which the monitored element is evicted. In an embodiment, the message is treated as a metric event and the group corresponding to the message (e.g., the group being joined or exited) is treated as a monitored element and the process returns to block 802.

By evaluating metric events and updating the membership of declared groups by applying declared group functions, behaviors of monitored elements can be observed without manually filtering and sorting lengthy system logs by a user or a system administrator. Additionally, behaviors of groups can be observed by treating groups as monitored elements. By using consistent hashing, the processing of metric events can be evenly distributed amongst System VMs within a monitoring system. Furthermore, new System VMs can be easily added and System VM failures can be easily accommodated without requiring high processing overhead to remap monitored elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details.

In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for monitoring elements of a distributed computing system, the method comprising:
    evaluating a metric event from a monitored element based on at least one of tags and conditions of the monitored element by applying declared group functions corresponding to declared groups over the metric event; and
    selecting from available options of admitting the monitored element into membership of a declared group, evicting the monitored element from membership of a declared group, and maintaining membership of the monitored element in a declared group based on the evaluation of the metric event.

2. The method of claim 1, wherein the monitored element is admitted into membership of a declared group when a declared group function corresponding to the declared group returns true when evaluated over the metric event.

3. The method of claim 1, wherein the monitored element is evicted from membership of a declared group when:
    the monitored element is a member of the declared group; and
    the corresponding declared group function returns false when evaluated over the metric event.

4. The method of claim 1, wherein membership of the monitored element in a declared group is maintained when:
    the monitored element is a member of the declared group; and
    the corresponding declared group function returns true when evaluated over the metric event.

5. The method of claim 1, the method further comprising generating an audit log, the audit log recording a timestamp indicating when the monitored element is at least one of admitted and evicted from a declared group.

6. The method of claim 1, wherein the monitored element is at least one of a cluster, a virtual machine, a data store, a network, and a declared group.

7. The method of claim 1, wherein tags are assigned to a monitored element by a user.

8. The method of claim 1, wherein the metric event is routed to a system VM for evaluation by a consistent hash message bus based on a routing key of the metric event used by a consistent hashing algorithm.

9. The method of claim 1, wherein the method further comprises transmitting a message to a consistent hash message bus when a monitored element is at least one of admitted and evicted into membership of a declared group, the message including the ID of the monitored element.

10. The method of claim 9, the method further comprising, when the message is received by the consistent hash message bus, updating a consistent hash table that maps a monitored element ID to a declared group ID.

11. A non-transitory computer-readable storage medium comprising instructions that, when executed in a computing device, cause the computing device to carry out steps for grouping elements of a distributed computing system monitored by a monitoring system, the steps comprising:
    evaluating a metric event from a monitored element based on at least one of tags and conditions of the monitored element by applying declared group functions corresponding to declared groups over the metric event; and
    selecting from available options of admitting the monitored element into membership of a declared group, evicting the monitored element from membership of a declared group, and maintaining membership of the monitored element in a declared group based on the evaluation of the metric event.

12. The non-transitory computer-readable storage medium of claim 11, wherein the monitored element is admitted into membership of a declared group when a declared group function corresponding to the declared group returns true when evaluated over the metric event.

13. The non-transitory computer-readable storage medium of claim 11, wherein the monitored element is evicted from membership of a declared group when:
    the monitored element is a member of the declared group; and
    the corresponding declared group function returns false when evaluated over the metric event.

14. The non-transitory computer-readable storage medium of claim 11, wherein membership of the monitored element in a declared group is maintained when:
    the monitored element is a member of the declared group; and
    the corresponding declared group function returns true when evaluated over the metric event.

15. The non-transitory computer-readable storage medium of claim 11, the method further comprising generating an audit log, the audit log recording a timestamp indicating when the monitored element is at least one of admitted and evicted from a declared group.

16. The non-transitory computer-readable storage medium of claim 11, wherein the monitored element is at least one of a cluster, a virtual machine, a data store, a network, and a declared group.

17. The non-transitory computer-readable storage medium of claim 11, wherein tags are assigned to a monitored element by a user.

18. The non-transitory computer-readable storage medium of claim 11, wherein the metric event is routed to a system VM for evaluation by a consistent hash message bus based on a routing key of the metric event used by a consistent hashing algorithm.

19. The non-transitory computer-readable storage medium of claim 11, wherein the method further comprises transmitting a message to a consistent hash message bus when a monitored element is at least one of admitted and evicted into membership of a declared group, the message including the ID of the monitored element.

20. The non-transitory computer-readable storage medium of claim 19, the method further comprising, when the message is received by the consistent hash message bus, updating a consistent hash table that maps a monitored element ID to a declared group ID.

* * * * *